United States Patent [19]
Northrop et al.

[11] Patent Number: 5,791,293
[45] Date of Patent: Aug. 11, 1998

[54] ANIMAL SHELTER FORMED IN THE SHAPE OF A NATURAL OBJECT

[75] Inventors: Melaney L. Northrop, Cleburne; Douglas J. Sharp, Arlington, both of Tex.

[73] Assignee: Doskocil Manufacturing Company, Inc., Arlington, Tex.

[21] Appl. No.: 547,058

[22] Filed: Oct. 23, 1995

Related U.S. Application Data

[63] Continuation-in-part of Ser. No. 30,923, Nov. 14, 1994, Pat. No. Des. 366,736, and a continuation-in-part of Ser. No. 453,430, May 30, 1995, abandoned.

[51] Int. Cl.$^6$ .................................................. A01K 1/03
[52] U.S. Cl. .......................... 119/498; 119/500; 119/501; D30/112
[58] Field of Search .......................... 119/28.5, 482, 119/496, 498, 500, 501; D30/108, 112, 117, 120

[56] References Cited

U.S. PATENT DOCUMENTS

| | | | |
|---|---|---|---|
| D. 193,239 | 7/1962 | Owles, Jr. | |
| D. 200,298 | 2/1965 | Daniel. | |
| D. 215,306 | 9/1969 | Hoff. | |
| D. 237,283 | 10/1975 | Evans. | |
| D. 237,964 | 12/1975 | Choponis. | |
| D. 244,949 | 7/1977 | Welker | D30/108 |
| D. 245,190 | 7/1977 | Higo | D30/108 |
| D. 246,540 | 11/1977 | Burleson | D30/112 |
| D. 257,493 | 11/1980 | Lodrick | D30/117 |
| D. 269,916 | 7/1983 | Lodrick | D30/117 |
| D. 288,733 | 3/1987 | Welker | D30/108 |
| D. 317,665 | 6/1991 | Marshall | D30/108 |
| D. 327,143 | 6/1992 | Dickinson | D30/108 |
| D. 366,541 | 1/1996 | Bradburn et al. | D30/108 X |
| 2,820,990 | 1/1958 | Johnson. | |
| 2,987,043 | 6/1961 | Spindler | 119/121 |
| 2,992,503 | 7/1961 | Webb | D30/112 X |
| 3,026,844 | 3/1962 | Spindler. | |
| 3,147,736 | 9/1964 | Daniel. | |
| 3,308,789 | 3/1967 | Artig. | |
| 3,468,771 | 9/1969 | Pedlow. | |
| 3,520,092 | 7/1970 | Petrik. | |
| 3,676,537 | 7/1972 | Winstead | 264/48 |
| 3,960,996 | 6/1976 | Balevski et al. | 264/37 |
| 4,038,350 | 7/1977 | Jacques | 264/416 |
| 4,096,218 | 6/1978 | Yasuike et al. | 264/45.5 |
| 4,161,924 | 7/1979 | Welker | 119/482 |
| 4,379,103 | 4/1983 | Doerfling | 264/45.5 |
| 4,602,396 | 7/1986 | Fraige | 5/668 |
| 4,603,078 | 7/1986 | Zanker et al. | 428/317.9 |
| 4,671,991 | 6/1987 | Payne | 428/309.9 |
| 4,721,299 | 1/1988 | Schlientz | 52/309.9 |
| 4,782,616 | 11/1988 | Hambleton | D30/112 X |
| 4,802,443 | 2/1989 | Denmark | 119/482 |
| 4,962,729 | 10/1990 | Barreto et al. | 119/482 |
| 5,188,063 | 2/1993 | Evans | 119/28.5 |
| 5,448,965 | 9/1995 | McClure | 119/482 |
| 5,551,371 | 9/1996 | Markey et al. | 119/482 |

FOREIGN PATENT DOCUMENTS

| | | |
|---|---|---|
| 2227818 | 11/1974 | France. |
| 2146941 | 5/1985 | United Kingdom. |

*Primary Examiner*—Robert P. Swiatek
*Assistant Examiner*—Elizabeth Shaw
*Attorney, Agent, or Firm*—Baker & Botts, L.L.P.

[57] ABSTRACT

An animal shelter (10) includes a top (20) formed as a unitary shell and shaped to resemble a natural object having an irregular surface, such as a tree stump. An entrance (26) is formed in the top (20) and allows an animal to enter and exit animal shelter (10). Because the top (20) is shaped to resemble a natural object, the animal shelter (10) blends into a natural setting. An extended floor (41) may be attached to the base (40), and an extended covering (28) may be attached to the top (20) adjacent the entrance (26). The extended covering (28) covers the extended floor (41). The extended covering (28) resembles an extension of the natural object, thus further enhancing the appearance of the animal shelter (10). A planter (60), removably seated upon the top (20), may be used to cultivate plants.

9 Claims, 4 Drawing Sheets

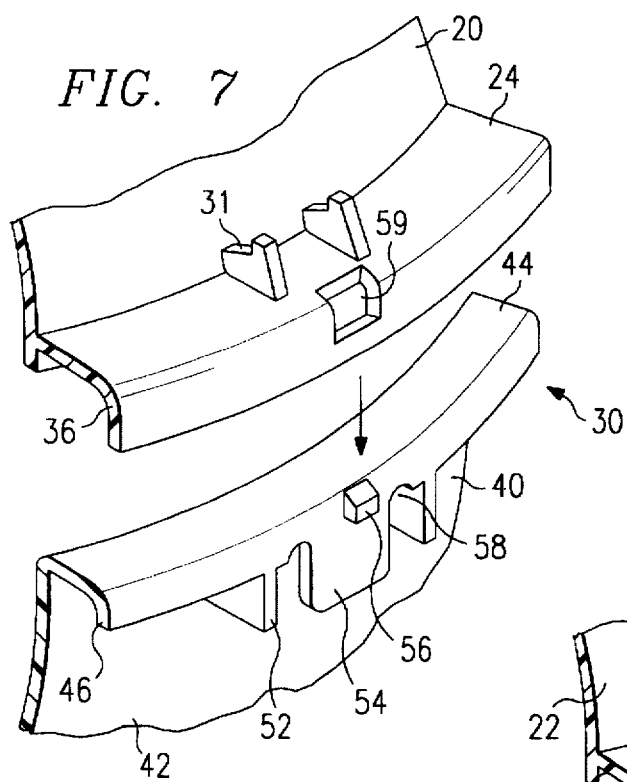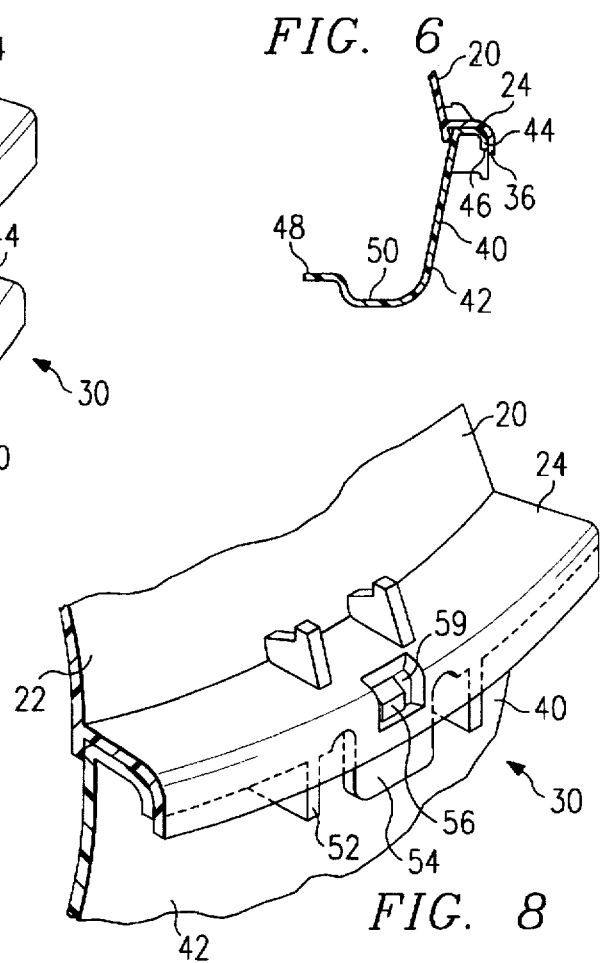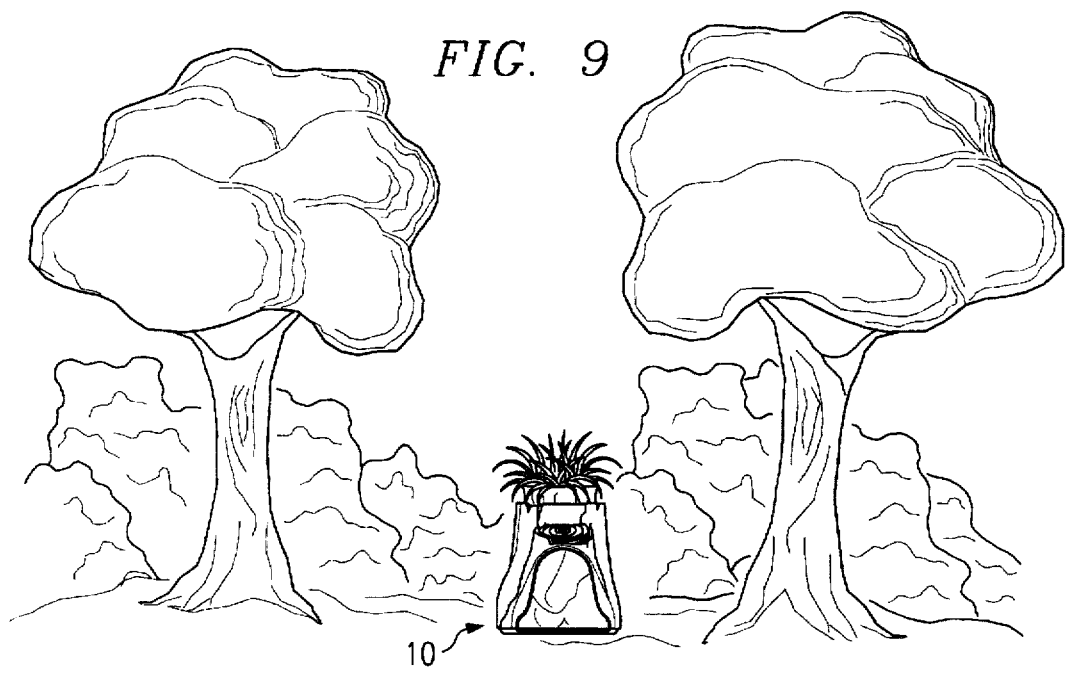

ANIMAL SHELTER FORMED IN THE SHAPE OF A NATURAL OBJECT

RELATED APPLICATION

This application is a continuation-in-part of design application Ser. No. 29/030,923, filed Nov. 14, 1994 now U.S. Pat. No. D366,736, entitled Stump Doghouse, attorney's docket no. 020908.0115, and application Ser. No. 08/453,430, filed May 30, 1995 now abandoned, entitled Animal Shelter, attorney's docket no. 020908.0139, both assigned to Doskocil Manufacturing Company, Inc.

TECHNICAL FIELD OF THE INVENTION

This invention relates to animal shelters, and more particularly to an animal shelter formed in the shape of an object that can be incorporated into a natural environment.

BACKGROUND OF THE INVENTION

Pet shelters are usually placed in an outside environment, such as a backyard. For years, animal shelters were constructed of metal or wood and formed in the shape of a small house with a sloped roof. Metal was susceptible to rust, however, and wood was susceptible to rot and termites. Furthermore, gaps between adjoining pieces of wood or metal allowed wind and precipitation from the outside environment to penetrate into such shelters. More recently, animal shelters have been constructed of plastic. These plastic animal shelters are formed in a unitary shell, such as an igloo or a helmet shape. One example of such a shelter is disclosed in U.S. Pat. No. 4,962,729 issued to Barreto on Oct. 16, 1990. Shelters formed in a unitary shell offer superior protection from the elements, but the regular shape of such shells do not blend with the surrounding setting of the outside environment. That is, the continuous lines and uniform pattern of prior animal shelters are often an eyesore to an otherwise serene and natural environment. Current trends dictate that structures be incorporated in the landscape with as little visual impact as possible. Consequently, a need has arisen for an aesthetically pleasing animal shelter formed from a unitary shell that blends with a natural outdoor setting.

SUMMARY OF THE INVENTION

In accordance with the present invention, the disadvantages and problems associated with previous animal shelters have been substantially reduced or eliminated. One aspect of the present invention provides an animal shelter formed in the shape of an object that fits into a natural environment.

According to an embodiment of the present invention, an animal shelter includes a top formed as a unitary shell and shaped to resemble a natural object having an irregular surface. An entrance is formed in the top. A generally flat base is detachably fixed to the top.

According to another embodiment of the present invention, an animal shelter includes a lower shell having a lower sidewall, a floor connected to a first end of the lower sidewall, a lower rim connected to a second end of the lower sidewall opposite the floor, and a raised section formed in the floor. An upper shell, detachably secured to the lower shell, has an irregularly-shaped sidewall, a roof connected to a first end of the irregularly-shaped sidewall, an upper rim connected to a second end of the irregularly-shaped sidewall opposite the roof, an aperture formed in the irregularly-shaped sidewall, an entry passageway connected to the irregularly-shaped sidewall proximate the aperture, and at least one vent opening formed in the irregularly-shaped sidewall proximate the roof. The upper shell is shaped to resemble a natural object. The upper rim is operable to overlap the lower rim. At least one latch formed partially in the lower shell and partially in the upper shell detachably secures the upper shell to the lower shell.

Important technical features of the present invention include providing an animal shelter having a unitary shell construction which blends into a natural setting. Another technical advantage includes providing an animal shelter that is capable of preventing ground water from leaking into the interior. Further technical advantages of the present invention include forming the animal shelter from a material that does not rust or rot. Another technical advantage includes providing an extended entryway to add further protection from the elements. Further technical advantages include providing a vent in the animal shelter to remove odors and humidity and also promote drafts to cool the interior. Another technical feature includes providing a structure that serves both as an animal shelter and a landscaping element. Another technical feature of the invention includes providing an animal shelter that may be adjusted for seasonal and climatic changes. Yet another technical advantage includes providing a planter to help the animal shelter blend into a natural setting. Other technical advantages are readily apparent to one skilled in the art from the following figures, description, and claims.

BRIEF DESCRIPTION OF THE DRAWINGS

For a complete understanding of the present invention and for further features and advantages, reference is now made to the following description taken in conjunction with the accompanying drawings, in which:

FIG. 6 is a sectional view of a portion of a unitary shell and a base;

FIG. 7 is a perspective view of an open position of a latch formed partially in the unitary shell and partially in the base;

FIG. 8 is a perspective view of a closed position of the latch illustrated in FIG. 7; and FIG. 9 illustrates the present invention as used in a natural setting.

DETAILED DESCRIPTION OF THE INVENTION

The preferred embodiment of the present invention and its advantages are best understood by referring to FIGS. 1–9 of the drawings, like numerals being used for like and corresponding parts of the various drawings.

Figure 1:
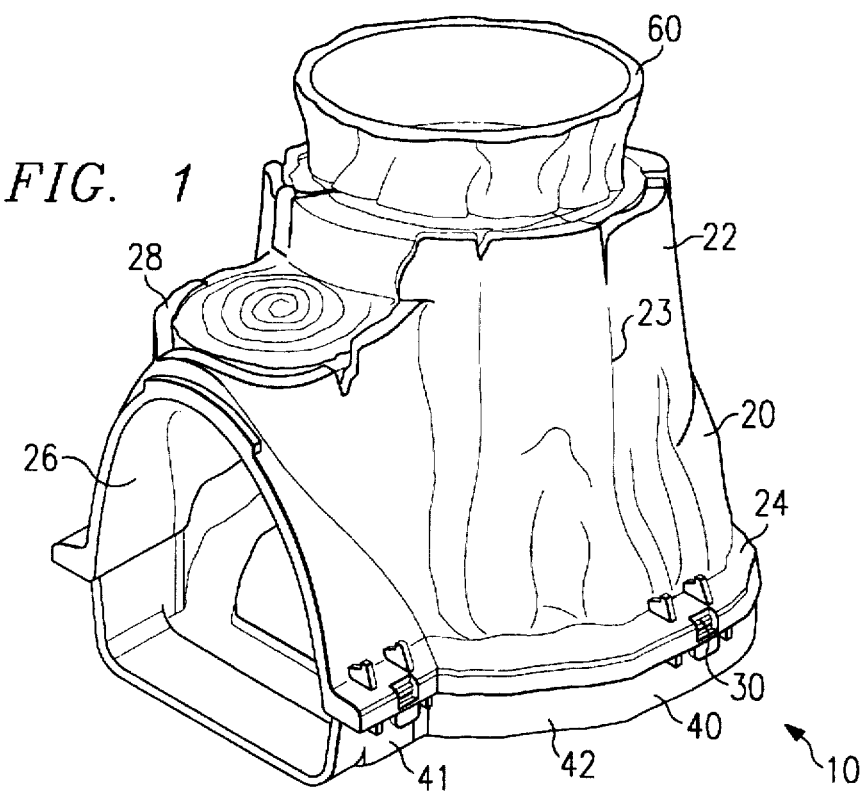
FIG. 1 is a perspective view of one embodiment of the present invention taken from the top front side.

FIG. 1 illustrates an animal shelter 10 formed in the shape of a natural object. In this embodiment, animal shelter 10 resembles a tree stump. In other embodiments, however, animal shelter 10 may resemble a rock formation, a fallen log, or any other natural object. Animal shelter 10 includes a top or upper shell 20, at least one latch or fastener 30, and a base or lower shell 40. Because animal shelter 10 resembles a natural object, it blends into a natural setting.

Top 20 comprises an irregularly-shaped sidewall 22, an upper rim 24, an aperture or entrance 26, and an extended covering or entryway 28 proximate aperture 26. Top 20 is formed in a unitary shell construction. Irregularly-shaped sidewall 22 and extended covering 28 are formed to resemble a natural object, in this case, a tree stump. Crevices 23 are formed in irregularly-shaped sidewall 22, upper rim 24, and extended covering 28 in order to further enhance the natural stump-like appearance of top 20. Upper rim 24 may be integrally formed in top 20. Upper rim 24 has a U-shaped cross section (FIG. 6) and mates with a similar rim on base 40. Aperture 26 formed in top 20 allows an animal to enter and exit animal shelter 10. Extended covering 28 is integrally formed in top 20 proximate aperture 26.

Figure 5:
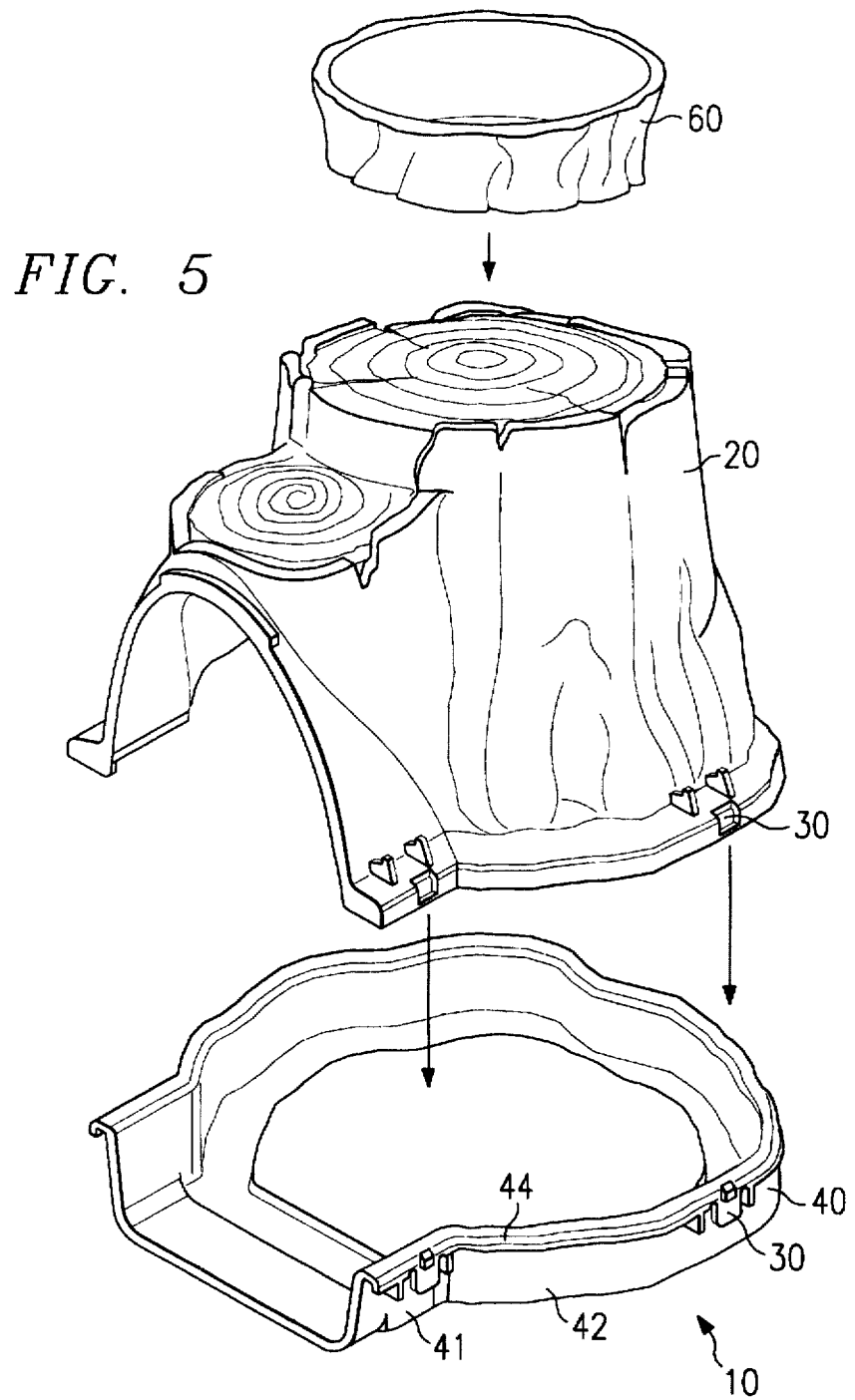
FIG. 5 illustrates the separate pieces of the embodiment of the invention first shown in FIG. 1.

Base 40 includes an extended floor 41, a lower sidewall 42, and a lower rim 44 (FIG. 5). In one embodiment, aperture 26 may also be partially formed in lower sidewall 42. Base 40 attaches to top 20 and is secured by one or more latches 30. In particular, extended floor 41 substantially conforms to extended covering 28. Likewise, lower rim 44 is shaped to substantially nestle within upper rim 24. Extended floor 41 is attached to lower sidewall 42. Extended floor 41 is elevated above the ground and may comprise a flood ramp (not shown), which is operable to prevent ground water from entering animal shelter 10. Lower rim 44 may be integrally formed in base 40. Base 40 also comprises a raised floor portion 48 and a lower floor portion 50 (both shown in FIG. 6), which will be described in more detail below.

Latches 30 are formed partially in top 20 and partially in base 40. As illustrated in FIGS. 7 and 8, latches 30 are integral to upper rim 24 and lower rim 44. Preferably, latches 30 are molded into top 20 and base 40 during the manufacture of these pieces. Latches 30 detachably connect top 20 to base 40. The operation of latches 30 is described in more detail with reference to FIGS. 7 and 8. When connected by latches 30, top 20 and base 40 cooperate to provide a substantially weather-tight seal for animal shelter 10 along upper rim 24 and lower rim 44.

A planter 60 is removably stackable upon top 20. Planter 60 is received on a ridge 29 that may be integrally formed in top 20 (FIG. 5). Planter 60 may be used to cultivate or display plants or other objects.

Figure 2:
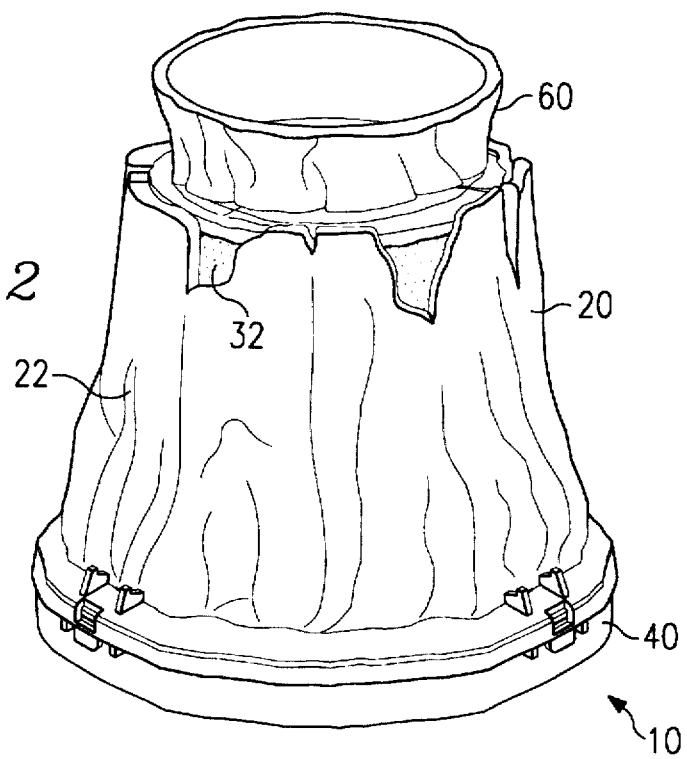
FIG. 2 is a perspective view of the embodiment of the invention illustrated in FIG. 1 taken along the top rear side.

FIG. 2 is a rear perspective view of animal shelter 10. FIG. 2 illustrates a vent 32 that may be formed in top 20. Vent 32 is configured to resemble a natural portion of a stump. Vent 32 is operable to vent odors and humidity from the interior of animal shelter 10. As shown in FIG. 2, vent 32 may comprise a plurality of openings formed in top 20. In other embodiments, vent 32 may consist of a single opening. A cover (not shown) may be used in conjunction with vent 32 to adjust the amount of ventilation provided by vent 32. The cover is disposed within a recessed pocket formed in irregularly-shaped sidewall 22. The recessed pocket prevents water from leaking into animal shelter 10.

Figure 3:
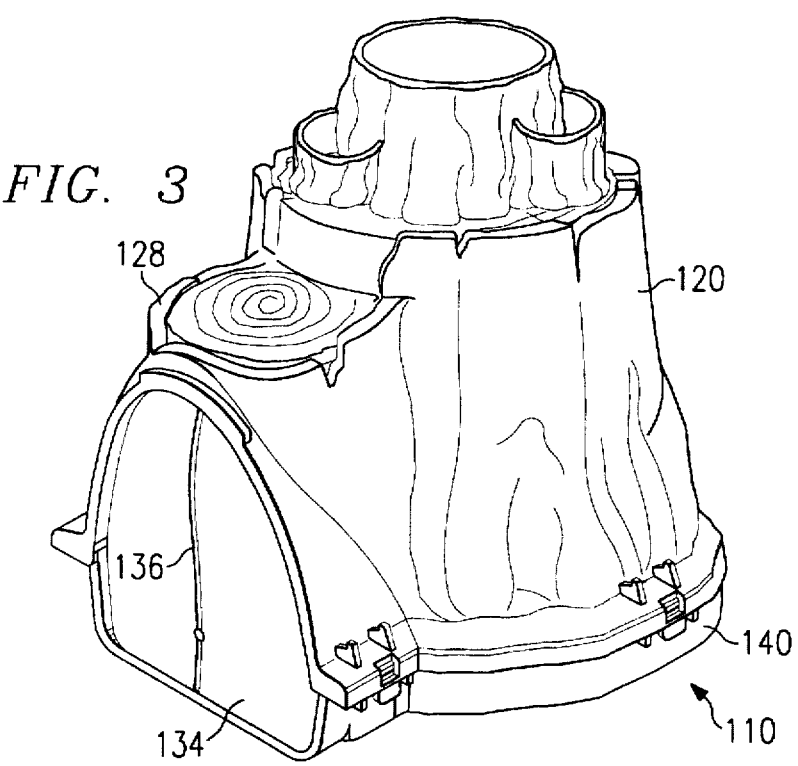
FIG. 3 is a perspective view of a second embodiment of the present invention.

FIG. 3 illustrates another embodiment of the present invention. FIG. 3 discloses an animal shelter 110 comprising a top 120, a base 140, a door 134, and a planter 160. Top 120 and base 140 are substantially similar to those disclosed in FIG. 1.

Door 134 is attached to an extended covering 128 and may be formed of a flexible, waterproof material such as vinyl. Angled pads or a rib (not shown), may be integrally formed in extended covering 128. The rib may serve as a point of attachment for door 134. Screws may be screwed directly into the rib to secure door 134. Alternatively, nuts and bolts may be used in conjunction with holes formed in the rib to attach door 134. A slit 136 runs down the length of door 134 to facilitate entry and exit of an animal into animal shelter 110 through an aperture 126. Door 134 is preferably formed of a flexible material because there is less chance that an animal will be injured when passing through extended covering 128. That is, in contrast to a rigid door, door 134 would not pinch or trap an animal's limb against either top 120 or base 140.

As illustrated in FIG. 3, extended covering 128 may be formed so that door 134 is completely recessed within the extended covering. In other words, the front of extended covering 128 is substantially vertical relative to the ground. Alternatively, the front of extended covering 128 may be formed with an angle so that the upper portion of the covering extends further out from the main portion of top 120 than the lower portion of the covering. In this alternative embodiment, door 134 is recessed within extended covering 128 only at the upper portion of the covering. At the lower portion of extended covering 128, door 134 is disposed just outside the covering so that the elements, such as rain and snow, are diverted away from the interior of animal shelter 110.

Planter 160, like planter 60 disclosed in FIGS. 1 and 2 is operable to contain plants. Planter 160 provides a plurality of segregated containers for growing different kinds of plants. Planter 160 is especially useful when it is desirable to grow different plants in a planter, but such plants cannot coexist. For example, a plant that would choke other plants may be cultivated separately in planter 160.

Figure 4:
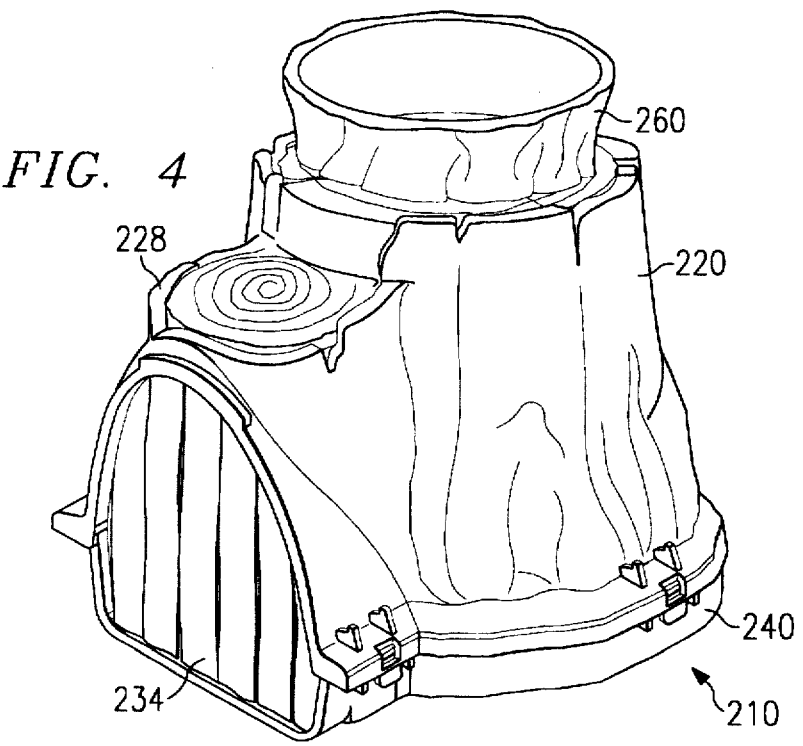
FIG. 4 is a perspective view of a third embodiment of the present invention.

FIG. 4 illustrates a third embodiment of the present invention. FIG. 4 discloses an animal shelter 210 comprising top 220, a base 240, strips 234, and a planter 260. Again, top 220 and base 240 are substantially similar to those disclosed in FIGS. 1 and 2.

Strips 234 are attached to an extended covering 228. Like door 134 shown in FIG. 3, strips 234 may be formed of a flexible, waterproof material, such as vinyl. A rib (not shown) may be integrally formed in extended covering 228 to serve as points of attachment for strips 234.

FIG. 5 illustrates the stackable configuration of top 20 onto base 40 and planter 60 onto top 20. Base 40 is shaped to conform to top 20. In particular, as will be discussed below, upper rim 24 is mounted in substantial conformity over lower rim 44 when top 20 is placed upon base 40. Ridge 29 may be formed in top 20 for receiving planter 60. Thus, planter 60 is frictionally secured to top 20. FIG. 5 also shows the separate elements of latches 30. As mentioned previously, latches 30 detachably secure top 20 to base 40.

It should be noted that each top 20 is formed so that it can be stacked with other tops 20. Likewise, each base 40 is formed so that it can be stacked with other bases. Furthermore, stacking tabs may be provided on the interior and exterior surfaces of top 20 and base 40. All of these features of animal shelter 110 facilitate the storage of a plurality of tops 20 and bases 40.

FIG. 6 is a sectional view of a portion of top 20 and base 40. FIG. 6 also illustrates the stackable configuration of top 20 to base 40. More specifically, upper rim 24 nestles over lower rim 44 when top 20 is removably fixed to base 40. An upper overhang 36 on top 20 extends beyond a lower overhang 46 of base 40 to direct water away from base 40, thus preventing water from leaking into the interior of animal shelter 10.

Lower sidewall 42 extends downwardly from lower rim 44 and connects to a lower floor portion 50. Because lower sidewall 42 and lower floor portion 50 are preferably formed of a continuous piece of plastic, no seams or gaps exist at the point of connection. Thus, lower sidewall 42 and lower floor portion 50 prevent water that may collect on the ground from seeping into animal shelter 10. Without the cooperation of lower sidewall 42 and lower floor portion 50, moisture would penetrate into the interior even though animal shelter 10 includes a floor.

A raised floor portion 48, connected to lower floor portion 50, is also disclosed in FIG. 6. Raised floor portion 48 is elevated above lower floor portion 50 and may include one or more drain holes (not shown). Thus, in the event water collects on raised floor portion 48, the water will be drained either outside of animal shelter 10 by the drain holes or down into lower floor portion 50.

FIG. 7 is a perspective view of an open position of latch 30 formed partially in top 20 and partially in base 40. The lower portion of latch 30 includes supports 52, a tab 54, a protrusion 56, and cutouts 58. Supports 52 extend outwardly from lower sidewall 42 to lower rim 24. Tab 54, protrusion 56, and cutouts 58 may be integrally formed in lower rim 44. The upper portion of latch 30 comprises receptacle 59 formed in upper rim 24.

From the open position of latch 30, animal shelter 10 may be easily assembled. In order to fix top 20 to base 40, protrusion 56 is aligned with receptacle 59 by means of tab 54. After aligning upper rim 24 to lower rim 44, top 20 is dropped into place over base 40. Supports 52 exert outwardly radial force upon lower overhang 46 of base 40 so that lower rim 44 remains in substantial conformity with upper rim 24. Supports 52 also transfer a substantial portion of the weight of top 20 from lower rim 44 to lower sidewall 42, which is better able to bear the force.

FIG. 8 is a perspective view of a closed position of latch 30. Tab 54 aligns with receptacle 59. Protrusion 56 extends through receptacle 59 to secure top 20 to base 40 so that neither force of nature nor an animal using animal shelter 10 may readily separate the two shells. Because supports 52 exert outwardly radial force upon lower rim 44, supports 52 provide a loose pressure fit between upper rim 24 and lower rim 44.

From the closed position of latch 30, animal shelter 10 may still be easily disassembled. In order to separate top 20 from base 40, tab 54 is pushed toward annular sidewall 42, thus forcing protrusion 56 out of receptacle 59. Top 20 may then be moved away from base 40.

FIG. 9 illustrates animal shelter 10 as used in a natural setting. To further enhance the blending, animal shelter 10 may be color-coordinated with the indigenous vegetation. Different regions have different kinds of trees. The color of animal shelter 10 may be chosen to match the local flora.

All the parts of top 20 and base 40, such as the walls, rims, floor, and roof, may be constructed of plastic. In a preferred embodiment, the parts are constructed of structured foam. This creates a rigid material capable of maintaining its shape under most circumstances to which animal shelter 10 would be exposed. Preferably, this material is comprised of multiple layers that may be manufactured in several ways.

In one embodiment, an outer layer, which is exposed to the elements, is formed of a rigid plastic, such as polyethylene. An inner layer, which faces the interior of animal shelter 10, is also formed of a rigid plastic like the outer layer. An intermediate foam layer is sandwiched between the inner and outer layers, forming an insulating layer.

Another technical feature of the present invention includes providing a shelter that can be used by a wide range of animals such as dogs, cats, rabbits, ducks, etc., either domestic or wild. In regard to domestic animals, animal shelter 10 may house either pets or commercial animals. Animal shelter 10 may be formed larger or smaller depending upon the type of animal to be sheltered. Because animal shelter 10 conforms to the surrounding setting, wild animals are less intimidated by the structure. Accordingly, such animals will be more likely to inhabit animal shelter 10 than other types of man-made structures.

Yet another feature includes providing a structure that serves as a landscaping element. Because animal shelter 10 resembles a natural object, it may be positioned in an outdoor environment to enhance the setting. Furthermore, planter 60 allows animal shelter 10 to be used as an elevated base for displaying prized plants.

An advantage of the present invention is that an animal using animal shelter 10 is protected from the elements. Because top 20 and base 40 are each formed of a single piece of rigid plastic, they are waterproof and able to prevent moisture from penetrating into animal shelter 10 from the top and the bottom, respectively. Also, the point of connection between top 20 and base 40 is weather tight because upper rim 24 overlaps lower rim 44. Crevices 23 serve as rain gutters to drain water from the exterior surface of animal shelter 10. Extended covering 28 cooperates with extended floor 41 to further reduce the impact of elements on the interior of animal shelter 10. The placement of extended floor 41 and annular sidewall 42 prevent ground water from seeping into the interior of animal shelter 10. Ridge 29, formed on extended covering 28, diverts rain away from the entryway. Door 134 provides additional weatherproofing for animal shelter 10 at the point of entry. Raised floor portion 48 serves several functions. To begin, even if water manages to penetrate animal shelter 10, raised portion 48 keeps an animal out of the water. That is, water collects in lower floor portion 50 so that raised floor portion 48 remains dry. Also, raised floor portion 48 is operable to trap a layer of insulating air between base 40 and the ground. In cold climates and during cold seasons, the ground acts as a heat sink for any object which it may contact. That is, the ground absorbs heat from any object which has a higher temperature than the ground. The layer of air trapped beneath raised floor portion 48 substantially reduces conductive heat loss of an animal's body heat through base 40 into the ground.

Another advantage of the present invention is that animal shelter 10 may readily be taken apart and reassembled. As discussed above, latch 30 allows animal shelter 10 to be easily assembled and disassembled without tools.

Other advantages include providing a shelter that may be adjusted for seasonal and climatic changes. As noted above, various levels of ventilation are achieved by adjusting the vent cover with respect to vent 32. Thus, the cover may be opened fully to allow vent 32 to cool the interior in warmer climates and during warmer seasons. Likewise, during cool periods, the cover may be used to completely seal vent 32, and thus minimize the cooling effect in animal shelter 10. Furthermore, door 134 or strips 234 may be attached to or removed from animal shelter 10 to adjust for various changes. During cool weather, door 134 or strips 234 may be attached to reduce the penetration of wind and precipitation, such as rain or snow, through aperture 26. During warm weather, door 134 or strips may be removed to increase the ventilating effect of aperture 26 through animal shelter 10.

Yet another feature of the invention includes providing a durable shelter that requires little maintenance. Shelters made of metal may rust over time. Shelters made of wood may rot or become infected with termites. As with other plastics, however, the structural parts of animal shelter 10 will not rust or corrode. Additionally, animal shelter 10 may be formed from a plastic that has been treated to resist damage caused by ultraviolet rays. Furthermore, animal shelter 10 may easily be cleaned by spraying with a hose or wiping with a sponge.

A technical advantage of the present invention includes providing a removable planter 60. Planter 60 helps animal shelter 10 blend into a natural setting. That is, plants contained within planter 60 may be of the kind indigenous to the area in which animal shelter 10 is located. Furthermore, planter 60 may be used to grow ivy which would extend out of planter 60 and over much of animal shelter 10. Additionally, planter 60 may be separated from the rest of animal shelter 10. Thus, plants contained within planter 60 may be moved indoors or to another sheltered location during severe weather. In this way, new plants do not need to be cultivated each year.

Although the present invention and its advantages have been described in detail, it should be understood that various changes, substitutions, and alterations can be made without departing from the spirit and scope of the invention as defined by the appended claims.

What is claimed is:

1. An animal shelter, comprising:

a base;

a top formed as a unitary shell and removably fixed to the base, the top shaped to resemble a natural object having an irregular surface;

an aperture formed in the top, the aperture operable to allow an animal to pass therethrough;

an extended floor attached to the base;

an extended covering attached to the top adjacent the aperture and operable to cover the extended floor, the extended covering also shaped to resemble a natural object;

at least one vent opening formed in the top, the vent opening operable to vent the animal shelter; and a planter removably fixed upon the top, the planter operable to contain plants planted therein.

2. The animal shelter of claim 1, further comprising a flood ramp formed in the extended floor.

3. The animal shelter of claim 1, further comprising:

an lower rim formed in the base;

an upper rim formed in the top; and the lower rim and the upper rim operable to removably fix the base to the top.

4. The animal shelter of claim 1, further comprising a plurality of crevices nonuniformly disposed in the top.

5. The animal shelter of claim 1, further comprising at least one fastener formed partially in the base and partially in the top, the fastener operable to detachably fasten the base to the top.

6. The animal shelter of claim 1, further comprising a vent cover adjustably mounted to the top proximate the vent opening, the vent cover operable to adjust the amount of ventilation provided by the vent opening.

7. An animal shelter, comprising:

a lower shell having a lower sidewall, a floor connected to a first end of the lower sidewall, a lower rim connected to a second end of the lower sidewall opposite the floor, and a raised section formed in the floor;

an upper shell comprising an irregularly-shaped sidewall, a roof connected to a first end of the irregularly-shaped sidewall, an upper rim connected to a second end of the irregularly-shaped sidewall opposite the roof, an aperture formed in the irregularly-shaped sidewall, an entry passageway connected to the irregularly-shaped sidewall proximate the aperture, and at least one vent opening formed in the irregularly-shaped sidewall proximate the roof;

the upper shell shaped to resemble a natural object;

the upper rim operable to overlap the lower rim; and at least one latch formed partially in the lower shell and partially in the upper shell, the latch operable to detachably secure the upper shell to the lower shell.

8. The animal shelter of claim 7, further comprising a plurality of flexible strips attached to the entry passageway.

9. The animal shelter of claim 7, further comprising gutters formed in the roof and the irregularly-shaped sidewall, the gutters operable to drain water from the upper shell.

* * * * *